(12) United States Patent
Guo et al.

(10) Patent No.: US 11,441,026 B2
(45) Date of Patent: Sep. 13, 2022

(54) THREE-STAGE POLYMER PARTICLE

(71) Applicant: Rohm and Haas Company, Collegeville, PA (US)

(72) Inventors: Hailan Guo, Warrington, PA (US); Pu Luo, King Of Prussia, PA (US); Morris Wills, Philadelphia, PA (US)

(73) Assignee: Rohm and Haas Company, Collegeville, PA (US)

( * ) Notice: Subject to any disclaimer, the term of this patent is extended or adjusted under 35 U.S.C. 154(b) by 0 days.

(21) Appl. No.: 16/980,586

(22) PCT Filed: Mar. 4, 2019

(86) PCT No.: PCT/US2019/020495
§ 371 (c)(1),
(2) Date: Sep. 14, 2020

(87) PCT Pub. No.: WO2019/190702
PCT Pub. Date: Oct. 3, 2019

(65) Prior Publication Data
US 2021/0054183 A1 Feb. 25, 2021

Related U.S. Application Data

(60) Provisional application No. 62/649,737, filed on Mar. 29, 2018.

(51) Int. Cl.
*C08L 25/12* (2006.01)

(52) U.S. Cl.
CPC ........... *C08L 25/12* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 4,753,988 A | 6/1988 | Henton et al. | |
| 4,994,522 A | 2/1991 | Sasaki et al. | |
| 5,196,480 A | 3/1993 | Seitz et al. | |
| 5,932,655 A | 8/1999 | Auclair et al. | |
| 7,153,899 B2 | 12/2006 | Reddy et al. | |
| 7,629,414 B2* | 12/2009 | Bardman | C08F 265/04 524/804 |
| 8,013,063 B2 | 9/2011 | Lee et al. | |
| 8,137,803 B2* | 3/2012 | Kitaike | B32B 27/08 428/327 |
| 9,156,976 B2* | 10/2015 | Guo | C08F 2/001 |
| 9,340,637 B2 | 5/2016 | Ahn et al. | |
| 2002/0055580 A1* | 5/2002 | Lorah | C08F 2/00 524/445 |
| 2006/0270803 A1 | 11/2006 | Dhawan et al. | |
| 2012/0264871 A1 | 10/2012 | Moon et al. | |
| 2016/0297957 A1 | 10/2016 | Boeckmann et al. | |

FOREIGN PATENT DOCUMENTS

| | | |
|---|---|---|
| CN | 105175972 | 12/2015 |
| EP | 0096412 A2 | 12/1983 |
| EP | 534212 B1 | 12/1995 |
| EP | 0953583 A2 | 11/1999 |
| EP | 1719787 | 11/2006 |
| EP | 1841810 B1 | 5/2012 |
| KR | 1094176 B1 | 12/2011 |
| KR | 2013090732 | 8/2013 |
| KR | 2014096748 | 8/2014 |
| KR | 2015072095 | 6/2015 |
| WO | 2013028403 | 2/2013 |
| WO | 2014035608 | 3/2014 |
| WO | 2015078751 | 6/2015 |

* cited by examiner

*Primary Examiner* — Ronak C Patel
(74) *Attorney, Agent, or Firm* — Carl P. Hemenway; Brian Lee Mutschler

(57) ABSTRACT

Provided is polymer particle comprising
(a) 40% to 85% by weight, based on the dry weight of the polymer particle, a core polymer having Tg of −35° C. or lower;
(b) 15% to 50% by weight, based on the dry weight of the polymer particle, an intermediate polymer having Tg that is 20° C. or lower and that is higher than the Tg of the core polymer by 10° C. or more;
(c) 5% to 30% by weight, based on the dry weight of the polymer particle, a shell polymer having Tg of 50° C. or higher;
wherein the shell polymer comprises polymerized units of all vinyl aromatic monomers in an amount of 1% or less, by weight based on the weight of the shell polymer.

4 Claims, No Drawings

THREE-STAGE POLYMER PARTICLE

One method of improving the performance of a polymer is to mix the polymer with polymer particles that contain portions that have relatively low glass transition temperature (Tg). The polymer particles become distributed in a continuous phase of the original polymer (the "matrix" polymer). The presence of these low-Tg particles ("impact modifiers") can provide improved impact resistance. One important class of polymers that are often used as matrix polymers is copolymers that contain polymerized units of styrene and acrylonitrile ("SAN" polymers).

U.S. Pat. No. 4,753,988 describes SAN polymers mixed with impact modifiers. It is desired to provide improved impact modifiers that impart better impact resistance to SAN. Many previously-known impact modifiers for SAN contain a relatively high level of polymerized units of low-Tg monomers. It is desired to provide improved impact modifiers that impart good impact resistance to SAN while containing a comparatively low amount of polymerized units of low-Tg monomer.

The following is a statement of the invention.

A first aspect of the present invention is a polymer particle comprising:
(a) 40% to 85% by weight, based on the dry weight of the polymer particle, a core polymer having Tg of −35° C. or lower;
(b) 15% to 50% by weight, based on the dry weight of the polymer particle, an intermediate polymer having Tg that is 20° C. or lower and that is higher than the Tg of the core polymer by 10° C. or more; and
(c) 5% to 30% by weight, based on the dry weight of the polymer particle, a shell polymer having Tg of 50° C. or higher;
wherein the shell polymer comprises polymerized units of all vinyl aromatic monomers in an amount of 1% or less, by weight based on the weight of the shell polymer.

A second aspect of the present invention is a polymeric composition comprising a continuous phase that comprises a matrix polymer and a dispersed phase comprising polymer particles, wherein the polymer particles comprise:
(a) 30% to 85% by weight, based on the dry weight of the polymer particles, a core polymer having Tg of −35° C. or lower;
(b) 15% to 50% by weight, based on the dry weight of the polymer particles, an intermediate polymer having Tg that is 20° C. or lower and that is higher than the Tg of the core polymer by 10° C. or more; and
(c) 5% to 30% by weight, based on the dry weight of the polymer particles, a shell polymer having Tg of 50° C. or higher;
wherein the shell polymer comprises polymerized units of all vinyl aromatic monomers in an amount of 1% or less, by weight based on the weight of the shell polymer.

A third aspect of the present invention is a method of making a polymeric composition comprising subjecting a mixture comprising a matrix polymer and a plurality of polymer particles to mechanical shear while the thermoplastic polymer is in a melt state, wherein the polymer particles comprise:
(a) 30% to 80% by weight, based on the dry weight of the polymer particles, a core polymer having Tg of −35° C. or lower;
(b) 15% to 50% by weight, based on the dry weight of the polymer particles, an intermediate polymer having Tg that is 20° C. or lower and that is higher than the Tg of the core polymer by 10° C. or more; and
(c) 5% to 30% by weight, based on the dry weight of the polymer particles, a shell polymer having Tg of 80° C. or higher;
wherein the shell polymer comprises polymerized units of all vinyl aromatic monomers in an amount of 1% or less, by weight based on the weight of the shell polymer.

The following is a detailed description of the invention.

As used herein, the following terms have the designated definitions, unless the context clearly indicates otherwise.

As used herein, a "polymer" is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Molecules that can react with each other to form the repeat units of a polymer are known herein as "monomers." The repeat units so formed are known herein as "polymerized units" of the monomer.

Vinyl monomers have the structure (I):

where each of $R^1$, $R^2$, $R^3$, and $R^4$ is, independently, a hydrogen, a halogen, an aliphatic group (such as, for example, an alkyl group), a substituted aliphatic group, an aryl group, a substituted aryl group, another substituted or unsubstituted organic group, or any combination thereof. Vinyl monomers are capable of free radical polymerization to form polymers. Aliphatic groups, including alkyl groups, may be linear, branched, cyclic, or a combination thereof.

Some vinyl monomers have one or more polymerizable carbon-carbon double bonds incorporated into one or more of $R^1$, $R^2$, $R^3$, and $R^4$; such vinyl monomers are known herein as multifunctional vinyl monomers. Vinyl monomers with exactly one polymerizable carbon-carbon double bond are known herein as monofunctional vinyl monomers.

Vinyl aromatic monomers are vinyl monomers in which each of $R^1$ and $R^2$ is hydrogen, $R^3$ is hydrogen or alkyl, and —$R^4$ has the structure

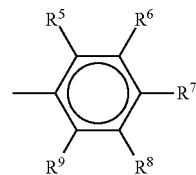

where each of $R^5$, $R^6$, $R^7$, $R^8$, and $R^9$ is, independently, a hydrogen, a halogen, an aliphatic group (such as, for example, an alkyl group or a vinyl group), a substituted aliphatic group, an aryl group, a substituted aryl group, another substituted or unsubstituted organic group, or any combination thereof.

Acrylic monomers are vinyl monomers in which each of $R^1$ and $R^2$ is hydrogen; $R^3$ is either hydrogen or methyl; and $R^4$ has one of the following structures:

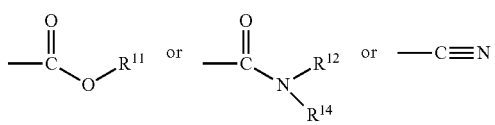

where each of $R^{11}$, $R^{12}$, and $R^{14}$ is, independently, hydrogen, a $C_1$ to $C_{14}$ alkyl group, or a substituted $C_1$ to $C_{14}$ alkyl group.

A polymer having 90% or more by weight polymerized units of vinyl monomers is a vinyl polymer. A polymer having 55% or more by weight of polymerized units of acrylic monomers are acrylic polymers. A polymer is considered herein to be crosslinked if the polymer contains 0.5% or more by weight polymerized units of multifunctional vinyl monomers. A crosslinked polymer is considered herein to be "fully" crosslinked if in a typical sample of the crosslinked polymer, 20% or less by weight of the polymer is material that is soluble in any solvent.

The category of multifunctional vinyl monomers contains two subcategories: crosslinkers and graftlinkers. In a crosslinker, every polymerizable vinyl group on the molecule is substantially the same as every other polymerizable vinyl group on the molecule. In a graftlinker, at least one polymerizable vinyl group on the molecule is substantially different from at least one other polymerizable vinyl group on the molecule. "Substantially" is defined by the molecular structure as follows. Each polymerizable vinyl group is defined by two carbon atoms and the groups $R^1$, $R^2$, $R^3$, and $R^4$ as shown above in structure (I). The "environment" of each carbon atom is defined herein as the configuration of atoms that is determined by following any path of three covalent bonds from one of the carbon atoms in structure (I).

For example, the following molecules are crosslinkers because in each molecule, every polymerizable vinyl group is identical in its chemical environment to every other polymerizable vinyl group in the same molecule: divinyl benzene, ethylene glycol diacrylate, and trimethylolpropane triacrylate. For another example, it useful to consider 1,3 butanediol diacrylate (1, 3-BDA):

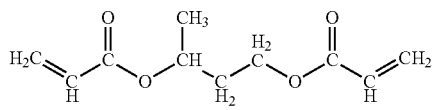

1,3-BDA is a crosslinker, because both of the polymerizable vinyl groups have the same "environment," as defined above. The "environment" of the vinyl group is shown in the following structure:

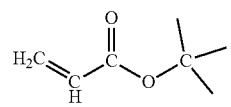

Examples of graftlinkers are allyl methacrylate, allyl acrylate, allyl acryloxypropionate, and diallyl maleate.

Chain transfer agents are molecules that react with growing polymer chains. When a chain transfer agent (CTA) is present during radical polymerization, the CTA can react with the radical at the growing end of a polymer chain. The result of this reaction is that the radical transfers from the growing chain to the CTA, and polymerization in that particular chain stops. Usually, the CTA then transfers the radical to a neutral monomer or polymer, thus initiating polymerization on a different chain from the original growing chain. Common CTAs are alkyl mercaptans (such as, for example, isomers of butyl mercaptan and isomers of dodecyl mercaptan) and halogenated hydrocarbons (such as, for example, carbon tetrabromide and carbon tetrachloride).

The glass transition temperature (Tg) of a homopolymer is determined by differential scanning calorimetry (DSC) at 10° C./minute, using the midpoint method. The Tg of a monomer is the Tg of a homopolymer made from that monomer. The glass transition temperature of a statistical copolymer of monomers labeled M1, M2, M3, through MN is determined by the Fox equation (*Bulletin of the American Physical Society*, 1, 3, page 123, 1956):

$$\frac{1}{TgP} = \frac{WM1}{TgM1} + \frac{WM2}{TgM2} + \ldots + \frac{WMN}{TgMN}$$

where TgP is the Tg of the polymer, WM1 is the weight fraction of monomer M1, WMJ is the weight fraction of the Jth monomer (i.e., monomer MJ), TgM1 is the Tg of monomer M1, and TgMJ is the Tg of the Jth monomer (i.e., monomer MJ). To perform the calculation in the Fox equation all temperatures are in Kelvin, including TgP and every TgMJ. The results are then converted to ° C. for reporting and discussion.

A collection of particles is characterized by the diameters. If a specific particle is not spherical, the diameter of that specific particle is taken herein to be the diameter of an imaginary particle that has the same volume as the specific particle. A collection of particles is characterized by the volume-average diameter.

Polymer particles are said herein to be dispersed in a matrix polymer if the matrix polymer forms a continuous phase and the polymer particles are distributed throughout matrix polymer. The polymer particles may be distributed randomly or in some non-random pattern.

A composition is said herein to be in the melt state if the elastic shear modulus, as determined by dynamic mechanical analysis at 10 sec$^{-1}$, is 10,000 dyne/cm$^2$ or lower.

A thermoplastic polymer is a polymer that is solid at 25° C., that may be put into a melt state at a temperature above 25° C., cooled back to 25° C., then put into a melt state again at a temperature above 25° C.

A polymer that contains polymerized units of styrene and polymerized units of acrylonitrile is known herein as "SAN." SAN contains 60% to 90% by weight polymerized units of styrene and 10% to 40% by weight polymerized units of acrylonitrile. In SAN polymers, the sum of the weight percentages of styrene and acrylonitrile is 70% or more. Polymerized units of other monomers, such as, for example, alkyl (meth)acrylates monomers, may be present.

Ratios are described herein as follows. For example, if a ratio is said to be 3:1 or greater, that ratio may be 3:1 or 5:1 or 100:1 but may not be 2:1. The general statement of this idea is as follows: when a ratio is said herein to be X:1 or greater, it is meant that the ratio is Y:1, where Y is greater than or equal to X. Similarly, for example, if a ratio is said to be 15:1 or less, that ratio may be 15:1 or 10:1 or 0.1:1 but may not be 20:1. Stated in a general way: when a ratio is said herein to be W:1 or less, it is meant that the ratio is Z:1, where Z is less than or equal to W.

The present invention involves the use of polymer particles. The polymer particle contains a core polymer, an intermediate polymer, and a shell polymer. Preferably, the core polymer resides at the center of the polymer particle. In some embodiments ("layer embodiments"), the intermediate polymer is disposed as a layer around the core polymer. In some embodiments ("blend embodiments") the intermediate polymer forms a blend with a portion of the core polymer. Among blend embodiments, it is preferred that a portion of the core polymer does not blend with the intermediate polymer. Also contemplated are embodiments in which some of the intermediate polymer blends with some of the core polymer, and some of the intermediate polymer is disposed as a layer around the core polymer. In all embodiments, preferably a DSC measurement on the polymer particles (10° C./minute, midpoint method) will show a glass transition temperature characteristic of the core polymer.

Preferably, some of the intermediate polymer is grafted to the core polymer. That is, preferably the polymer particle contains polymers that comprise core polymer that is grafted to intermediate polymer. The presence and the concentration of grafted polymer may be determined as follows. Preferably, the core polymer is crosslinked, and the amount of soluble polymer in the core polymer may be studied by solubility experiments on the core polymer in isolation. Then, the combination of core polymer and intermediate polymer having a known total amount of intermediate polymer may be studied by extracting soluble polymer from the combination with an appropriate solvent. The soluble polymer will contain both soluble core polymer and soluble intermediate polymer. The amount of intermediate polymer that is not dissolved in the solvent is considered to be grafted to the crosslinked (and therefore insoluble) portion of the core polymer.

The shell polymer, like the intermediate polymer, may be disposed as a layer around the combination of core and intermediate polymers, may be blended with a portion of the core and/or intermediate polymers, or a combination thereof. Preferably, a portion of the core polymer is grafted to the intermediate polymer or to the core polymer or to a combination thereof. Grafting of the core polymer may be determined by the same methods described above regarding grafting of the intermediate polymer.

The core polymer has Tg of −35° C. or lower; preferably −40° C. or lower; more preferably −45° C. or lower. Preferred core polymers are vinyl polymers; more preferred are acrylic polymers.

Preferably the amount of core polymer, by weight of the polymer particles, is 30% or more; more preferably 35% or more; more preferably 40% or more; more preferably 45% or more. Preferably the amount of core polymer, by weight of the polymer particles, is 85% or less; more preferably 80% or less; more preferably 75% or less; more preferably 70% or less; more preferably 65% or less; more preferably 60% or less.

Preferably the amount of polymerized units of acrylic monomers in the core polymer, by weight of the core polymer, is 60% or more; more preferably 75% or more; more preferably 90% or more; more preferably 95% or more. Preferably the core polymer contains polymerized units of an unsubstituted alkyl ester of (meth)acrylic acid; more preferably polymerized units of an unsubstituted alkyl ester of acrylic acid; more preferably a monomer selected from ethyl acrylate, butyl acrylate, 2-ethylhexyl acrylate, and mixtures thereof. Preferably, the amount of polymerized units of unsubstituted alkyl ester of (meth)acrylic acid in the core polymer is, by weight of the core polymer, 75% or more; more preferably 80% or more; more preferably 85% or more; preferably 90% or more; more preferably 95% or more.

Preferably the core polymer contains polymerized units of one or more crosslinker monomer, one or more graftlinker, or a combination thereof; more preferably the core polymer contains polymerized units of one or more graftlinker and one or more crosslinker. The amount of polymerized units of crosslinker is preferably, by weight of the core polymer, 0.2% or more; more preferably 0.4% or more; more preferably 0.6% or more; more preferably 0.8% or more. The amount of polymerized units of crosslinker is preferably, by weight of the core polymer, 5% or less; more preferably 4% or less; more preferably 3% or less.

The amount of polymerized units of graftlinker in the core polymer is preferably, by weight of the core polymer, 0.1% or more; more preferably 0.2% or more; more preferably 0.3% or more; more preferably 0.4% or more. The amount of polymerized units of graftlinker in the core polymer is preferably, by weight of the core polymer, 3% or less; more preferably 2% or less; more preferably 1% or less.

Preferred crosslinkers have two or more (meth)acrylate groups; more preferably two or more acrylate groups. Preferred crosslinkers have molecular weight of 600 or less; more preferably 500 or less; more preferably 400 or less; more preferably 300 or less. Preferred graftlinkers have one or more (meth)acrylate groups and one or more allyl groups. Preferred graftlinkers have molecular weight of 500 or less; more preferably 400 or less; more preferably 300 or less; more preferably 200 or less.

The core polymer preferably contains polymerized units of all monomers having Tg above 10° C. in an amount that is, by weight of the core polymer, 10% or less; more preferably 5% or less; more preferably 2% or less; more preferably 1% or less; more preferably 0.5% or less; more preferably 0%.

The core polymer preferably contains polymerized units of all vinyl aromatic monomers in an amount that is, by weight of the core polymer, 10% or less; more preferably 5% or less; more preferably 2% or less; more preferably 1% or less; more preferably 0.5% or less; more preferably 0%.

The intermediate polymer has Tg of −20° C. or lower, and the Tg of the intermediate polymer is higher than the Tg of the core polymer by 10° C. or more. Preferred intermediate polymers are vinyl polymers; more preferred are acrylic polymers.

Preferably the amount of intermediate polymer, by weight of the polymer particles, is 15% or more; more preferably 20% or more; more preferably 25% or more; more preferably 30% or more. Preferably the amount of intermediate polymer, by weight of the polymer particles, is 50% or less; more preferably 45% or less; more preferably 40% or less.

Preferably the amount of polymerized units of acrylic monomers in the intermediate polymer, by weight of the intermediate polymer, is 60% or more; more preferably 75% or more; more preferably 90% or more; more preferably 95% or more. Preferably the intermediate polymer contains polymerized units of an unsubstituted alkyl ester of (meth)acrylic acid; more preferably polymerized units of an unsubstituted alkyl ester of acrylic acid; more preferably a monomer selected from ethyl acrylate, butyl acrylate, 2-ethylhexyl acrylate, and mixtures thereof. Preferably, the amount of polymerized units of unsubstituted alkyl ester of (meth)acrylic acid in the intermediate polymer is, by weight of the core polymer, 75% or more; more preferably 80% or more; more preferably 85% or more; preferably 90% or more; more preferably 95% or more.

Preferably the intermediate polymer contains polymerized units of one or more crosslinker monomer, one or more graftlinker, or a combination thereof; more preferably the core polymer contains polymerized units of one or more graftlinker. The amount of polymerized units of crosslinker in the intermediate polymer is preferably, by weight of the intermediate polymer, 1% or less; more preferably 1% or less; more preferably 0.2% or less; more preferably 0.1% or less; more preferably 0%. The amount of polymerized units of graftlinker in the intermediate polymer is preferably, by weight of the intermediate polymer, 0.1% or more; more preferably 0.2% or more; more preferably 0.3% or more; more preferably 0.4% or more. The amount of polymerized units of graftlinker in the intermediate polymer is preferably, by weight of the intermediate polymer, 3% or less; more preferably 2% or less; more preferably 1% or less.

The preferred types of crosslinkers and graftlinkers for the intermediate polymer are the same as those described above for core polymer.

The intermediate polymer preferably contains polymerized units of all vinyl aromatic monomers in an amount that is, by weight of the intermediate polymer, 10% or less; more preferably 5% or less; more preferably 2% or less; more preferably 1% or less; more preferably 0.5% or less; more preferably 0%.

The intermediate polymer preferably contains polymerized units of one or more vinyl monomer having Tg of $-30°$ C. or lower. Preferably the amount of polymerized units of vinyl monomer having Tg of $-30°$ C. or lower in the intermediate polymer is, by weight of the intermediate polymer, 85% or less; more preferably 80% or less; more preferably 75% or less; more preferably 7% or less. Preferably the amount of polymerized units of vinyl monomer having Tg of $-30°$ C. or lower in the intermediate polymer is, by weight of the intermediate polymer, 30% or more; more preferably 40% or more; more preferably 50% or more; more preferably 55% or more.

The intermediate polymer preferably contains polymerized units of one or more vinyl monomer having Tg of $80°$ C. or higher. Preferably the amount of polymerized units of vinyl monomer having Tg of $80°$ C. or higher in the intermediate polymer is, by weight of the intermediate polymer, 55% or less; more preferably 50% or less; more preferably 45% or less; more preferably 40% or less. Preferably the amount of polymerized units of vinyl monomer having Tg of $80°$ C. or higher in the intermediate polymer is, by weight of the intermediate polymer, 15% or more; more preferably 20% or more; more preferably 25% or more; more preferably 30% or more.

The shell polymer has Tg of $50°$ C. or higher, and the Tg of the shell polymer is higher than the Tg of the intermediate polymer by $10°$ C. or more. Preferred shell polymers are vinyl polymers; more preferred are acrylic polymers.

Preferably the amount of shell polymer, by weight of the polymer particles, is 5% or more; more preferably 10% or more. Preferably the amount of shell polymer, by weight of the polymer particles, is 25% or less; more preferably 20% or less.

Preferably the amount of polymerized units of acrylic monomers in the shell polymer, by weight of the shell polymer, is 60% or more; more preferably 75% or more; more preferably 90% or more; more preferably 95% or more. Preferably the shell polymer contains polymerized units of an unsubstituted alkyl ester of (meth)acrylic acid; more preferably polymerized units of an unsubstituted alkyl ester of acrylic acid; more preferably a monomer selected from ethyl acrylate, butyl acrylate, 2-ethylhexyl acrylate, and mixtures thereof. Preferably, the amount of polymerized units of unsubstituted alkyl ester of (meth)acrylic acid in the shell polymer is, by weight of the core polymer, 75% or more; more preferably 80% or more; more preferably 85% or more; preferably 90% or more; more preferably 95% or more.

Preferably the amount of polymerized units of crosslinker in the shell polymer is preferably, by weight of the shell polymer, 0.1% or less; more preferably 0%. The amount of polymerized units of graftlinker in the shell polymer is preferably, by weight of the shell polymer, 0.1% or less; more preferably 0%.

The shell polymer preferably contains polymerized units of all vinyl aromatic monomers in an amount that is, by weight of the shell polymer, 10% or less; more preferably 5% or less; more preferably 2% or less; more preferably 1% or less; more preferably 0.5% or less; more preferably 0%.

The shell polymer preferably contains polymerized units of one or more vinyl monomer having Tg of $-30°$ C. or lower. Preferably the amount of polymerized units of vinyl monomer having Tg of $-30°$ C. or lower in the shell polymer is, by weight of the shell polymer, 30% or less; more preferably 25% or less; more preferably 20% or less. Preferably the amount of polymerized units of vinyl monomer having Tg of $-30°$ C. or lower in the shell polymer is, by weight of the shell polymer, 2% or more; more preferably 5% or more; more preferably 8% or more.

The shell polymer preferably contains polymerized units of one or more vinyl monomer having Tg of $80°$ C. or higher. Preferably the amount of polymerized units of vinyl monomer having Tg of $80°$ C. or higher in the shell polymer is, by weight of the shell polymer, 98% or less; more preferably 95% or less. Preferably the amount of polymerized units of vinyl monomer having Tg of $80°$ C. or higher in the shell polymer is, by weight of the shell polymer, 70% or more; more preferably 75% or more; more preferably 80% or more.

Preferably the polymer particles have volume-average diameter of 500 nm or lower; more preferably 400 nm or lower; more preferably 300 nm or lower; more preferably 200 nm or lower. Preferably the polymer particles have volume-average diameter of 50 nm or larger; more preferably 75 nm or larger; more preferably 90 nm or larger.

Preferably, in the polymer particles, the total amount of polymerized units of monomers having Tg of $-30°$ C. or lower is, by weight of the polymer particles, 85% or less; more preferably 80% or less; more preferably 75% or less. Preferably, in the polymer particles, the total amount of polymerized units of monomers having Tg of $-30°$ C. or lower is, by weight of the polymer particles, 55% or more; more preferably 60% or more; more preferably 65% or more; more preferably 70% or more.

The polymer particles may be made by any method. A preferred method of making the polymer particles is aqueous emulsion polymerization. Preferably, the core polymer is made by aqueous emulsion polymerization to form a latex of dispersed particles made of core polymer. Preferably, the intermediate polymer is then made by aqueous emulsion polymerization in the presence of the dispersed particles of core polymer to form a latex that contains dispersed particles that contain both core polymer and intermediate polymer. Optionally, one or more additional intermediate polymers are then made by aqueous emulsion polymerization in the presence of the latex formed by the previous polymerization steps. Preferably the shell polymer is made by aqueous emulsion polymerization in the presence of the latex formed by the previous polymerization steps.

In some aqueous emulsion polymerization processes, a chain transfer agent may be included in the monomer or mixture of monomers. Preferably, in the polymerization of the core polymer, the amount of chain transfer agent is, by weight based on the weight of the core polymer, 0.5% or less; more preferably 0.2% or less; more preferably 0.1% or less; more preferably 0.05% or less; more preferably 0%. Preferably, in the polymerization of the intermediate polymer, the amount of chain transfer agent is, by weight based on the weight of the intermediate polymer, 0.5% or less; more preferably 0.2% or less; more preferably 0.1% or less; more preferably 0.05% or less; more preferably 0%. Preferably, in the polymerization of the shell polymer, the amount of chain transfer agent is, by weight based on the weight of the shell polymer, 0.5% or less; more preferably 0.2% or less; more preferably 0.1% or less; more preferably 0.05% or less; more preferably 0%.

When a latex of polymer particles distributed in water has been made by aqueous emulsion polymerization, it is preferred to dry the particles. Water may be removed from the latex by any method. Preferred are methods that contain either spray drying or coagulation. When coagulation is used, the coagulation step forms a wetcake, which is preferably separated from water by mechanical means such as a belt press, and the wetcake is preferably further dried, for example by fluid bed drying. Preferably, the dry form of the polymer particles is a powder, in which each particle of the powder contains many polymer particles. Typical powder particles have diameter 10 μm to 1 mm.

The polymer particles may be used for any purpose. A preferred use of the polymer particles is as an additive to another polymer, called the "matrix" polymer, to form a polymeric composition.

In the polymeric composition, preferably the amount of polymer particles is, by weight of the polymeric composition, 10% or more; more preferably 30% or more; more preferably 35% or more. In the polymeric composition, preferably the amount of polymer particles is, by weight of the polymeric composition, 60% or less; more preferably 50% or less; more preferably 45% or less.

The polymeric composition may be formed by any method. Preferably, mixture of matrix polymer and polymer particles is heated to be in a melt state, and the mixture is subjected to mechanical shear. For example, powder of matrix polymer may be mixed with powder form of polymer particles, at a temperature low enough so that the matrix polymer does not melt, and then the mixture of powder and powder may be fed to an extruder, which heats the mixture to form a melt and applies shear to the mixture. For another example, powder of matrix polymer and powder form of polymer particles may be fed separately to an extruder, which then provides heat and shear. It is contemplated that mechanical shear will intimately mix the polymer particles with the resin polymer, so that the powder particles break up and then the individual polymer particles are distributed in the matrix polymer.

The matrix polymer may be any type of polymer. Preferred are thermoplastic polymers; more preferred are SAN polymers.

It is expected that the presence of the polymer particles of the present invention will improve the properties of the polymeric composition. In particular, when the matrix resin is SAN, it is expected that the polymeric composition will have impact resistance better than unmodified SAN.

The following are examples of the present invention.

The following abbreviations are used:
BA=butyl acrylate
BDA=1,3-butanediol diacrylate
ALMA=allyl methacrylate
MMA=methyl methacrylate
SAN=styrene/acrylonitrile copolymer, KIVISAN PN 128, from ChiMei Corporation
IM=impact modifier
n-DDM=n-dodecyl mercaptan Polymer particles of the present invention were made in emulsion polymerization and then dried to form powder. Polymer particles of the present invention are considered to be impact modifiers in these Examples.

Impact testing was performed as follows. Samples were prepared as follows. SAN powder was blended with IM powder at temperature low enough that the SAN did not melt. The powder blend was processed in a 2-roll mill (Collin Mill, from W. H. Collin GmbH Maschienefabrik, Aichach, Germany) at 185° C. for 5 minutes. After the milling was completed, the molten polymer was slowly peeled from the metal rolls, and placed into a metal mold, and compression molded into plaques with a thickness of 3.175 mm (⅛ inch). A CARVER™ press (Carver Press Inc., Menomonee Falls, Wis.) was used with an operating temperature of 190° C. and pressing conditions of 2304 kgf (2.268 tons) for 3 minutes, followed by 9216 kgf (9.07 tons) for 2 minutes, and a 5-minute cooling period (at 23° C., room temperature) at 9216 kgf (9.07 tons). The plaque was cut into 6.35 cm×1.27 cm (2.5 in×0.5 in) bars. Impact testing was the notched Izod procedure of ASTM D256 (American Society of Testing and Materials).

Color depth was measured as follows. Samples were prepared as for impact testing except that carbon black masterbatch was added to the powder blend prior to milling. The carbon black masterbatch had 50% by weight carbon black. The amount of carbon black masterbatch was 1.5% by weight of the total sample. Color of the finished plaque was assessed with a desktop spectrophotometer from X-rite, which reported L*, a*, and b*. Lower values of L* show deeper color, which is more desirable.

Latex particle size was measured by dynamic light scattering.

EXAMPLE A: PREPARATION OF "EXAMPLE A" IMPACT MODIFIER

Polymer particles of the present invention were made by aqueous emulsion polymerization. In a first stage, the core polymer was made by aqueous emulsion polymerization. Then, in a second stage, the intermediate polymer was made by aqueous emulsion polymerization in the same vessel in the presence of the core polymer. Then, in a third stage, the shell polymer was made by aqueous emulsion polymerization in the presence of the core and intermediate polymers. The monomers and proportions were as follows:

| | Polymerization of Example A | | | | |
|---|---|---|---|---|---|
| Stage %[1] | BA[2] | BDA[2] | ALMA[2] | MMA[2] | Fox Tg (° C.) |
| 50 | 98.5 | 1.0 | 0.5 | 0 | −50 |
| 35 | 64.7 | 0 | 0.5 | 34.8 | −12 |
| 15 | 10.0 | 0 | 0 | 90.0 | 80 |

[1]weight % of stage, based on weight of total polymer particle
[2]weight % of monomer, based on the weight of the individual stage The polymer particles made in Example A had volume-average diameter of 130 nm.

EXAMPLE B: EXAMPLE MODIFIERS 1-6

Six polymerizations were performed as described in Example A. Example 5 is identical to Example A. Each latex was dried, and the powder was blended with SAN to make impact samples and color samples as described above. The composition of each core, intermediate ("interm"), and shell stage was the same as in Example A, except where noted below. In some Examples, n-DDM was added during the polymerization of the shell polymer. "Ex" means "Example."

The results were as follows:

| | | | Polymerization of Examples 1-6 | | | | | |
|---|---|---|---|---|---|---|---|---|
| Ex | Core[3] | Interm[3] | Shell[3] | n-DDM[4] | D[5] | BA[9] | IM[6] | Impact[7] |
| 1 | 50 | 20 | 30 | 0.4 | 119 | 65.2 | 35 | 65 |
| 2a | 50 | 35 | 30 | 0.4 | 120 | 73.4 | 35 | 72 |
| 2b | 50 | 35 | 30 | 0.4 | 120 | 73.4 | 40 | 98 |
| 3 | 65 | 20 | 15 | 0.4 | 122 | 78.5 | 40 | 84 |
| 4 | 75 | 10 | 15 | 0.4 | 124 | 81.8 | 40 | 75 |
| 5 | 50 | 35 | 15 | 0 | 128 | 73.4 | 40 | 213 |
| 6 | 50 | 35 | 15[8] | 0 | 124 | 71.9 | 40 | 121 |

[3]% by weight based on the weight of the polymer particle
[4]n-DDM % used in polymerization of shell polymer by weight of shell polymer
[5] volume-average diameter of latex particles by dynamic light scattering (nm)
[6]% weight of impact modifier based on total weight of IM plus SAN
[7]results of Izod impact test at 25° C., Joules/meter
[8]in Example 6, shell polymer composition was 100% MMA
[9]total BA from all stages, as a weight % of polymer particles All the Examples 1-6 showed acceptable Izod impact results. The IM used in Example 2a was identical to the IM used in Example 2b, and that IM is referred to herein as Example 2. The comparison of Example 1 with Example 2a shows that, at 35% amount of IM, the IM of Example 2 was superior to the IM of Example 1. Therefore, it is expected that, if Example 1 were tested at 40% of IM used, it would still be true that the IM of Example 2 would be superior to the IM of Example 1. Examples 5 and 6 (no n-DDM) were superior to all the others, and Example 5 (with BA in the shell) was superior to Example 6. Among the samples with n-DDM, the best was Example 2 (same stage ratios as Examples 5 and 6).

EXAMPLE C: COMPARISON OF EXAMPLE A WITH COMMERCIAL IMPACT MODIFIERS

Example A was compared with three commercial impact modifiers, as follows. None of the commercial impact modifiers fall within the definition of the polymer particles of the present invention. Each of the commercial IMs has a core/shell composition with no intermediate layer. Composition of the core and shell are given below, separated with the symbol "//." The numbers in the "description" denote the amount by weight of each stage. Examples with a suffix "C" are comparative examples.

| | | Comparison with Commercial Impact Modifiers | | | | |
|---|---|---|---|---|---|---|
| Ex | IM | Description | D[10] | Load[11] | Izod[12] | L*[13] |
| 7C | none | unmodified SAN | — | 0 | 21 | 27.29 |
| 8C | IM1 | 95 BA//5 MMA | 120 | 40% | 99 | 26.79 |
| 9 | | Example A | 128 | 40% | 213 | 24.1 |
| 10C | IM2 | 92 Rubber[14]//8 MMA | 350 | 40% | 112 | 26.89 |
| 11C | IM3 | styrene-containing core, acrylic shell | 80 | 40% | 11 | 26.06 |

[10]volume-average diameter of latex particles by dynamic light scattering (nm)
[11]% weight of impact modifier based on total weight of IM plus SAN
[12]results of Izod impact test at 25° C., Joules/meter
[13]L* values above 26.5 are considered poor. L* values of 26.5 or below are considered good
[14]"Rubber" is a crosslinked polymer of Tg less than −30° C.

Example A gave the best impact results by far. Example A also had good color depth, and the only other IM that gave good color depth was Comparative 11C, which had poor had impact resistance.

The invention claimed is:

1. A polymer particle comprising
   (a) 40% to 85% by weight, based on the dry weight of the polymer particle, a core polymer having Tg of −35° C. or lower;
   (b) 15% to 50% by weight, based on the dry weight of the polymer particle, an intermediate polymer having Tg that is 20° C. or lower and that is higher than the Tg of the core polymer by 10° C. or more;
   (c) 5% to 30% by weight, based on the dry weight of the polymer particle, a shell polymer having Tg of 50° C. or higher;
   wherein the shell polymer comprises polymerized units of all vinyl aromatic monomers in an amount of 1% or less, by weight based on the weight of the shell polymer.

2. The polymer particle of claim 1, wherein the shell polymer comprises polymerized units of a monomer having Tg of −30° C. or lower.

3. The polymer particle of claim 1, wherein the core polymer comprises polymerized units of one or more graftlinkers.

4. The polymer particle claim 1, wherein the polymer particle has volume-average diameter of 500 nm or smaller.

* * * * *